United States Patent [19]
Bressel et al.

[11] 3,821,287
[45] June 28, 1974

[54] OXIDATIVE DEHYDROGENATION OF METHYL ISSBUTGRATE

[75] Inventors: Ulrich Bressel, Mannheim; Werner Fuchs, Ludwigshafen; Rolf Platz, Mannheim, all of Germany

[73] Assignee: Badische Anilin- & Soda-fabrik Aktiengesellschaft, Ludwigshafen/Rhein, Germany

[22] Filed: Aug. 28, 1972

[21] Appl. No.: 283,986

[52] U.S. Cl......... 260/486 D, 260/465.9, 260/669 R
[51] Int. Cl............................................. C07c 69/54
[58] Field of Search............................... 260/486 D

[56] References Cited
FOREIGN PATENTS OR APPLICATIONS
1,147,217  4/1969  Great Britain................. 260/486 D
1,260,460  2/1968  Germany....................... 260/486 D Primary Examiner—Lorraine A. Weinberger
Assistant Examiner—Paul J. Killos
Attorney, Agent, or Firm—Johnston, Keil, Thompson & Shurtleff

[57]  ABSTRACT

In the oxidative dehydrogenation of organic compounds by means of free halogen, it is an advantage to obtain the free halogen as a result of ammonium halide splitting by bringing an aqueous ammonium halide solution into contact with a flame produced by burning hydrogen or combustible organic gases with oxygen or oxygen-containing gases.

1 Claim, No Drawings

OXIDATIVE DEHYDROGENATION OF METHYL ISSBUTGRATE

The invention relates to a process for the oxidative dehydrogenation of organic compounds by means of free halogen obtained from ammonium halide, in which process the halogen is introduced into the reaction system in a novel manner.

Processes for the oxidative dehydrogenation of organic compounds in which the halogen, preferably iodine, is used and recovered in the form of aqueous ammonium iodide solutions are known for example from German Pat. No. 1,260,460 and German Published Specification No. 1,275,061. In the dehydrogenation of ethylbenzene to styrene the ammonium iodide is introduced directly into the reactor as an aqueous solution.

The process has proved valuable with fluidized bed reactors which are arranged ahead of the actual reaction chambers. Newer developments in this field, however, have caused serious difficulties to arise, above all when the dehydrogenation is carried out in a so-called impulse reactor, in which the reactants are introduced into the reaction zone by means of nozzles. One of the principal disadvantages is the low yield; another is the frequently observed blockage of the nozzles which is brought about by entrained fluidized particles.

It is known that ammonium iodide may be reacted to iodine in a fluidized bed (i.e., a fluidized bed reactor ahead of the reaction zone); this has already been described in the case of oxidative dehydrogenation of ethylbenzene in German Specification No. 1,260,460. The performance of the oxidative dehydrogenation in an impulse reactor necessitates the provision of a separate fluidized bed generator for the decomposition of the ammonium halide solution. In this process the blockage of the nozzles referred to above frequently occurs.

The object of the present invention is to provide a method which assures the fullest possible decomposition of the ammonium halide, which eliminates the difficulties referred to and simultaneously makes it possible to achieve higher yields.

This object is achieved by a process for the oxidative dehydrogenation of organic compounds which is carried out in known manner by means of free halogen as dehydrogenating agent, the halogen being obtained by thermal splitting of ammonium halide, wherein an aqueous solution of the ammonium halide (preferably the iodide) is brought into contact with a flame produced by the burning of hydrogen or a combustible organic gas with oxygen or an oxygen-containing gas, and the hot flue gas thus obtained is introduced into the reactor.

In accordance with the invention the aqueous ammonium halide solution (preferably the iodide solution) is introduced into the flame by, for example, atomization, in which event an almost quantitative splitting of the ammonium halide into elemental halogen occurs. The necessary combustible gas can be arbitrarily chosen, although natural gas, methane and hydrogen are preferred. It is however also possible to use other combustible hydrocarbon gases or coke-oven gases.

The process is for example carried out as follows: An ammonium halide solution, which has a concentration of at least 10 percent and may be saturated, is sprayed through a nozzle together with an amount of oxygen which is at least equivalent to the quantity required for the oxidation of the ammonium halide and does not exceed the amount of oxygen corresponding to the total quantity required for oxidative dehydrogenation, i.e., at least 0.5 mole of oxygen per mole of charge to be dehydrogenated. Besides this amount of oxygen required for chemical reaction, further oxygen is necessary for sustaining the flame. The quantity required for this is determined by the amount of combustible gas used, for example one-half mole of oxygen per mole of hydrogen or 2 moles of oxygen per mole of methane. The absolute quantity of oxygen required is governed by the temperature to be produced, and the concentration of the ammonium halide solution to be split should also be taken into account. For example, for the splitting of 8 liters of 45 percent ammonium iodide solution per hour $4m^3$ (S.T.P.) hydrogen and $3m^3$ (S.T.P.) oxygen are required if a temperature of for example about 650° C is to be produced. The flue gas, consisting essentially of iodine, oxygen and steam, is then led into the particular dehydrogenation reactor, for example through nozzles. This process can be applied in a particularly advantageous manner to the so-called impulse reactor. The construction of an impulse reactor is disclosed e.g., in German Pat. application No. P 21 44 150.9 (O.Z. 27 692). The apparatus for the splitting of ammonium halide solutions can however also be used in combination with other conventional types of reactor.

The temperature of the hot flue gas is, in general, 400 to 800° C, preferably 600° to 700° C.

The organic compounds which can be dehydrogenated in an advantageous manner in this way are those that can be dehydrogenated by other means known in the art for carrying out this reaction, i.e., hydrocarbons and their derivatives with 2 to 20 carbon atoms in the hydrocarbon skeleton, preferably those which can subsequently find use as monomer building blocks for all kinds of polymers or copolymers. Thus, for example, ethylbenzene, methyl isobutyrate and isobutyronitrile, from which styrene, methyl methacrylate or methacrylonitrile are produced, can be dehydrogenated by the method of the invention.

Because the dehydrogenation is in general carried out at a temperature from 400° to 800° C it is important that the iodine-containing reaction gases obtained as a result of contact with the flame should have a corresponding temperature when they are supplied to the reactor. One of the great advantages of the process according to the invention is that, by suitable choice of the quantity of combustible gas or the concentration of the ammonium halide solution, the temperature of the reactor can be controlled in a convenient manner. It is clear that a less highly concentrated ammonium halide solution provides a lower combustion temperature. Finally, the oxygen can also be preheated higher than the combustible gas so that the process consumes very little energy, i.e., makes optimum use of the heat energy available.

The method also guarantees substantially complete decomposition of the ammonium halide and, because no blockage of the nozzles can arise when an impulse reactor is used, trouble-free operation. The preferred use of hydrogen as combustible gas offers yet another advantage, namely that the volume of off-gas is small. This, having regard to the condensation of the reaction products, can be of great significance.

The following Examples illustrate the invention.

EXAMPLE 1 (Comparative)

A 200 l. impulse reactor which was heated with fuel gas was charged per hour through a three-fluid nozzle with 40 l of methyl isobutyrate at 160° C, 2.5m$^3$ (S.T.P.) of oxygen at 650° C, 7.5 l of NH$_4$I solution ($\gamma$ = 1.4) which was atomized with 1m$^3$ (S.T.P.) of O$_2$, and with 7.5 kg of steam at 4 atm. gauge. The escape velocity of the methyl isobutyrate amounted to 140 m/sec and that of the oxygen, which was introduced together with the steam through the nozzle, was 250 m/sec. The contribution of the NH$_4$I solution atomized with the oxygen is negligible. The temperature in the reactor was held between 500° and 520° C. A uniform temperature profile appeared, the maximum deviation at the individual measuring points amounting to 5° C. The gases leaving the reactor were quenched with cold water and the organic phase separating out was subjected to gas-chromatographic analysis after separation. The content of methyl methacrylate amounted to 23 percent. From these data, calculated on a discharge of 465 kg after 15 hours, a conversion of 20 percent and a yield of 56 percent can be calculated.

EXAMPLE 2 (Comparative)

A 10.5-l. impulse reactor of stainless steel was charged per hour through a two-fluid nozzle with 2 l. of methyl isobutyrate, the escape velocity of the ester amounting to 27 m/sec. A 2-l. fluidized bed reactor was connected in series to this impulse reactor and was filled with 500 ml of mullite and charged hourly with 300 ml of NH$_3$I solution ($\gamma$ = 1.4) and 120 l (S.T.P.) of O$_2$. The steam containing iodine and oxygen and produced in this manner was likewise brought through the two-fluid nozzle into the impulse reactor, the escape velocity amounting to 150 m/sec. The reactor was held at a temperature of 520° C by heating with flue gas. The reaction gases were quenched at the reactor exit and worked up as described above. The gas-chromatographic analysis of the organic discharge after 24 hours showed a content of 44.8 percent methyl methacrylate, the content of the hourly-taken samples fluctuating greatly, between 30 to 50 percent in extreme cases, because disturbances resulting from partial blockage by entrained fluidized bed particles repeatedly occurred. Calculated on an organic discharge of 32.9 kg the efficiency was 35.2 percent and the yield 61.3 percent.

EXAMPLE 3 (according to the invention)

A 210-l. impulse reactor heated with fuel gas was charged hourly for 15 hours with 60 l. of methyl isobutyrate and 3.4m$^3$ (S.T.P.) of O$_2$. In a combustion chamber arranged ahead of the same an oxygen/hydrogen flame was established which was fed hourly with 4.2m$^3$ (S.T.P.) of H$_2$ and 2.5m$^3$ (S.T.P.) of O$_2$. 11.6 l of NH$_4$I solution ($\gamma$ = 1.4) together with 1.5m$^3$ (S.T.P.) of O$_2$ was introduced per hour by means of a nozzle into this flame. The resultant gas mixture at 680° C was combined with the O$_2$ which had been pre-heated in a heat exchanger to 650° C and brought, together with the ester vapor which had been heated to 160° C, through a two-fluid nozzle into the impulse reactor. The escape velocity of the ester vapor amounted to 150 m/sec, whereas the steam containing iodine and oxygen was brought practically without loss of pressure through the nozzle into the reactor.

After 15 hours of operation an organic discharge of 709.5 kg was obtained, in which 36.2 percent methyl methacrylate was discovered. This is an efficiency of 32.7 percent and a yield of 74.3 percent.

EXAMPLE 4

With a throughput of 105 l/hr of methyl isobutyrate, 11.7 l/hr of NH$_4$I solution of density 1.5 were decomposed with 1.6m$^3$ (S.T.P.) per hour oxygen in the iodine generator in the oxygen/hydrogen flame, which was sustained with 4.0m$^3$ (S.T.P.) of hydrogen and 2.6m$^3$ (S.T.P.) of oxygen. The cracked gas leaving the iodine generator at 700° C was mixed with 6.2 m$^3$ (S.T.P.)/hr of oxygen at 650° C before the two-fluid nozzle and introduced through the two-fluid nozzle with the ester into a 210-l. impulse reactor maintained at 515° C. After 12.5 hours of operation 1054 kg of organic phase was obtained with a content of methyl methacrylate of 30.0 percent. The efficiency was 29.0 percent and the yield 83.9 percent.

EXAMPLE 5

With a throughput of only 16.5 l/hr of methyl isobutyrate through a 210-l. impulse reactor, 4 l of NH$_3$I solution of density 1.3 were decomposed hourly with 1.4m$^3$ (S.T.P.) of oxygen in the iodine generator in the oxygen/hydrogen flame, which was sustained with 2 m$^3$ (S.T.P.)/hr of hydrogen and 1 m$^3$ (S.T.P.)/hr of oxygen. With a reactor temperature of 520° C and after 24 hours an organic discharge of 310.7 kg was obtained which contained 40.0 percent methyl methacrylate. The efficiency was 36.0 percent with a 76.1 percent yield.

Definitions
efficiency = moles methyl methacrylate formed × 100/moles methyl isobutyrate fed in
yield = moles methyl methacrylate formed × 100/moles methyl isobutyrate used up
Concentration of the NH$_4$I solutions used:

| $\gamma$[g/cm$^3$] | % NH$_4$I |
|---|---|
| 1.3 | 34.2 |
| 1.4 | 46.3 |
| 1.5 | 57.1 |

EXAMPLE 6

In the same manner as described in Example 3 a 210 l. impulse reactor was fed for 25 hours with 40 l/hr of methyl isobutyrate and 2 m$^3$ (S.T.P.)/hr of oxygen, and the iodine generator with 0.75 m$^3$ (S.T.P.)/hr of natural gas, 2.7 m$^3$ (S.T.P.)/hr of oxygen and 7.9 kg/hr of aqueous ammonium iodide solution ($\gamma$ = 1.4). The temperature of the fuel gas leaving the iodine generator fluctuated between 650° and 720° C. The gas was combined in the nozzle with the other reactants. The reaction temperature was 515° to 520° C.

After completion of the reaction 757.8 kg of organic phase was obtained with a content of methyl methacrylate of 37.6 percent. The efficiency was 33 percent and the yield 70.5 percent.

We claim:

1. In a process for the oxidative dehydrogenation of methyl isobutyrate with free iodine obtained by thermal splitting of ammonium iodide, in a conventional reactor, the improvement which comprises providing the free iodine to the reaction by treating an ammonium iodide solution of a concentration of at least 10 percent w/w in finely divided form with an oxygen-containing fuel gas flame and charging the resulting gas to the reactor at a temperature of from 400° to 800° C.

* * * * *

UNITED STATES PATENT OFFICE
CERTIFICATE OF CORRECTION

Patent No. 3,821,287   Dated June 28, 1974

Inventor(s) Ulrich Bressel, Werner Fuchs, and Rolf Platz

It is certified that error appears in the above-identified patent and that said Letters Patent are hereby corrected as shown below:

In the heading, insert -- [30] Foreign Application Priority Data, 9-3-71, German Application, P 21 44 150.9.

Signed and Sealed this sixteenth Day of September 1975

[SEAL]

Attest:

RUTH C. MASON
*Attesting Officer*

C. MARSHALL DANN
*Commissioner of Patents and Trademarks*